Figure 1:
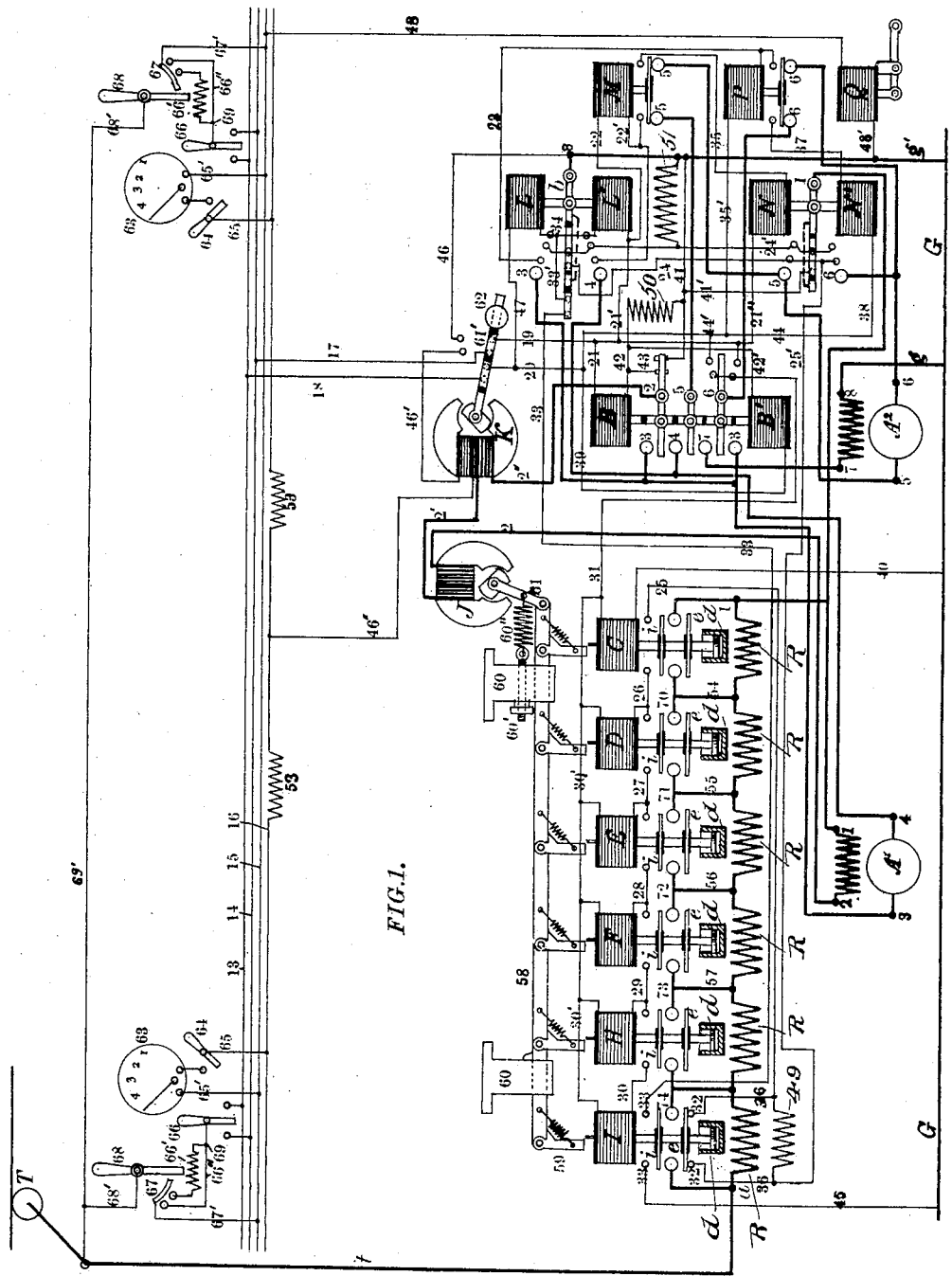

No. 769,812. PATENTED SEPT. 13, 1904.
W. BAXTER, Jr.
SYSTEM OF MULTIPLE ELECTRIC MOTOR CONTROL.
APPLICATION FILED AUG. 29, 1903.
NO MODEL. 4 SHEETS—SHEET 1.

WITNESSES
INVENTOR
Wm. Baxter, Jr.
By Knight Bros.
Attys.

No. 769,812. PATENTED SEPT. 13, 1904.
W. BAXTER, Jr.
SYSTEM OF MULTIPLE ELECTRIC MOTOR CONTROL.
APPLICATION FILED AUG. 29, 1903.
NO MODEL. 4 SHEETS—SHEET 2.

WITNESSES
INVENTOR
Wm. Baxter, Jr.
By Knight Bros
Atty.

No. 769,812. PATENTED SEPT. 13, 1904.
W. BAXTER, Jr.
SYSTEM OF MULTIPLE ELECTRIC MOTOR CONTROL.
APPLICATION FILED AUG. 29, 1903.
NO MODEL. 4 SHEETS—SHEET 3.

WITNESSES:
Jno. R. Adams
H. H. Simms

INVENTOR
Wm. Baxter, Jr.
By Knight Bros.
Attys.

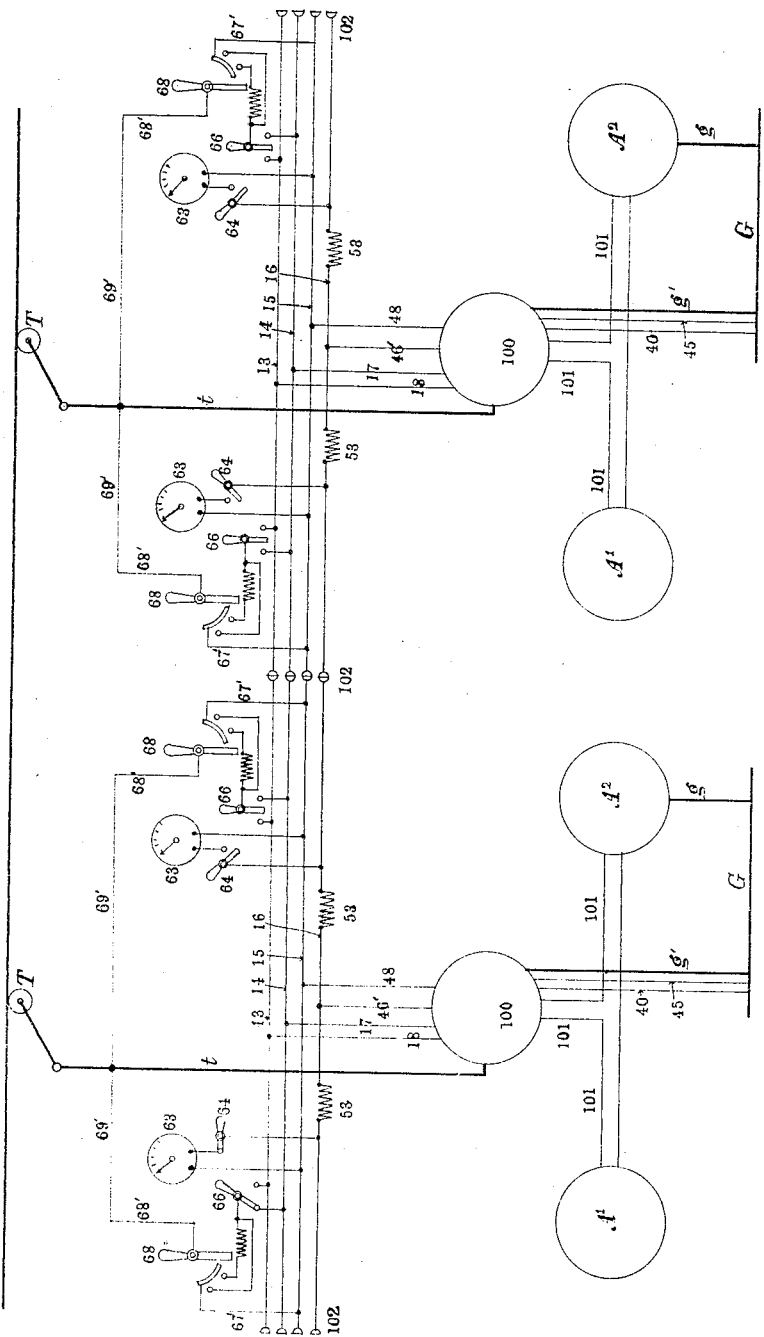

No. 769,812.

Patented September 13, 1904.

UNITED STATES PATENT OFFICE.

WILLIAM BAXTER, JR., OF JERSEY CITY, NEW JERSEY.

SYSTEM OF MULTIPLE-ELECTRIC-MOTOR CONTROL.

SPECIFICATION forming part of Letters Patent No. 769,812, dated September 13, 1904.

Application filed August 29, 1903. Serial No. 171,245. (No model.)

*To all whom it may concern:*

Be it known that I, WILLIAM BAXTER, Jr., a citizen of the United States, and a resident of Jersey City, in the county of Hudson and State of New Jersey, have invented certain new and useful Improvements in Systems of Multiple-Electric-Motor Control, of which the following is a specification.

This invention relates to means for controlling the motion of one or more motors from a more or less distant point by the movement of a simple switch which controls the flow of currents in circuits in which are connected electromagnetic switches that control directly the flow of current in the circuits of the motors to be controlled. It is intended particularly for use in connection with railway-trains made up in part or in whole of electrically-propelled cars, but is also applicable to any case in which it is desired to control the operation of a number of motors from a single point by the movement of a master switch or controller.

The object of the invention is to secure reliability of action, simplicity in construction, perfect control of the motion of all the motors automatically, and to protect them from the injurious effects of excessive currents, whether due to overloads or other causes.

In the drawings furnished herewith the system is shown as applied to an electric-railway train made up of cars provided with two motors each connected in the series-parallel relation now so commonly used and can be more clearly explained in connection with these drawings.

Figure 2:
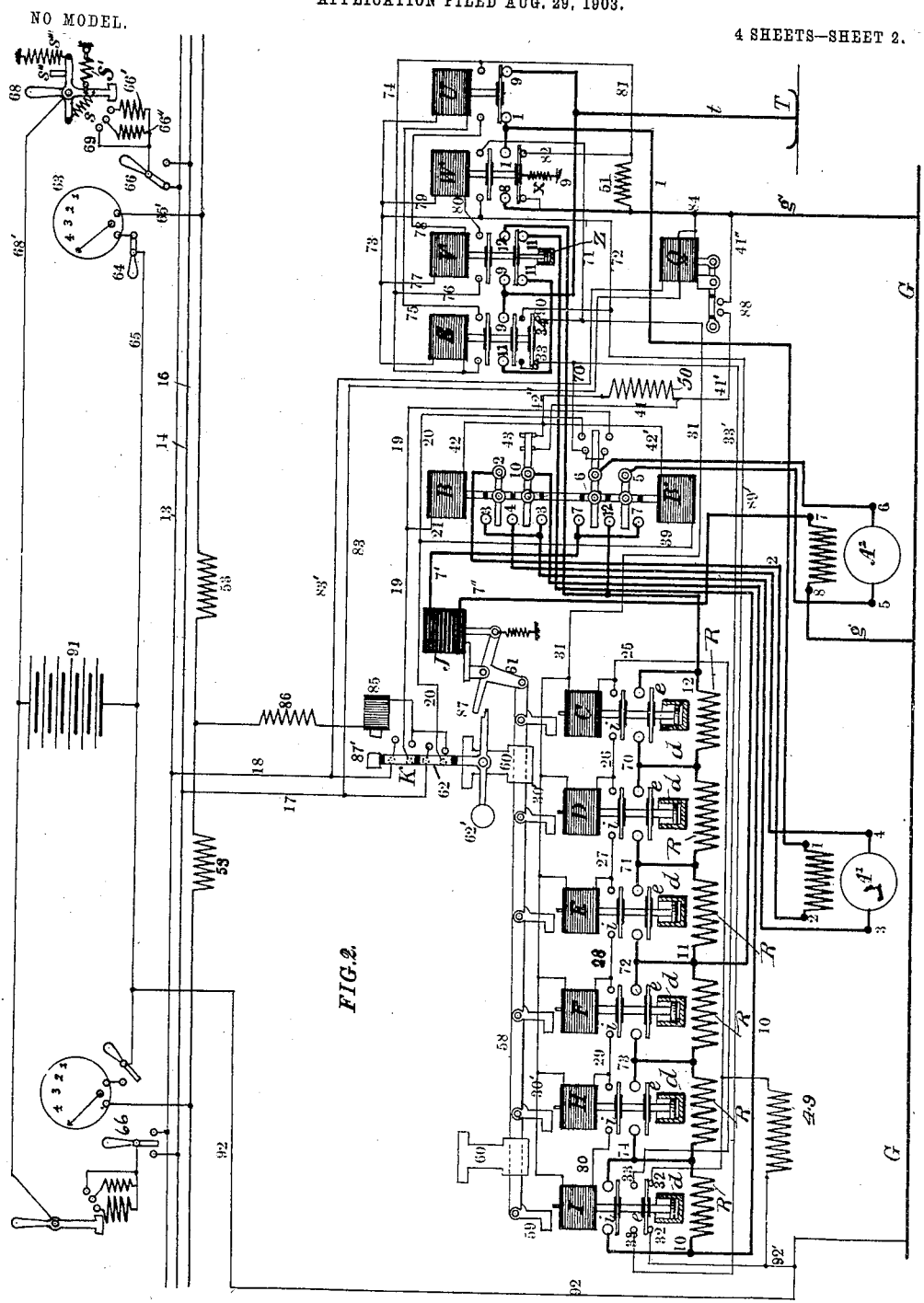

Figure 1 represents the system applied to a single car, the current for operating the motor-controlling switches being derived from the trolley-line. Fig. 2 shows the system also as applied to a single car, but differs from Fig. 1 in that the current to operate the motor-controlling switches is derived from a storage-battery, and in addition the connection of the motors in the circuit is different, and on this account the arrangement and connection in the circuits of the controlling-switches is somewhat modified. Figs. 3 to 7 show the various modifications in the connections of the motors in the circuit produced by the action of the controller-switches in Fig. 1. Figs. 8 to 12 show similar circuit changes produced by the action of the controller-switches in Fig. 2, and Fig. 13 shows the system applied to a train of cars.

The construction of the switches and other devices used forms no part of this invention. Therefore I have used such forms as most clearly illustrate the actions in a diagram. The invention is not restricted to any particular arrangement of the controlling-switches or of the circuit connections through which they are operated by the movement of the master-switch, and it is for the purpose of more clearly illustrating this fact that I have shown the two radically different diagrams Figs. 1 and 2. Each of these diagrams shows the system as applied to a single car, but as the arrangement of all the parts would be the same on any number of cars that might be used these diagrams fully illustrate the system as applied to a train consisting of any number of cars, as will be more fully shown hereinafter.

In all the drawings the same parts are designated by the same numbers or letters.

Figure 6:
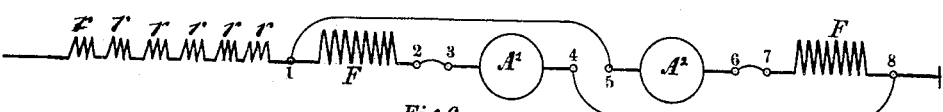
Figure 7:
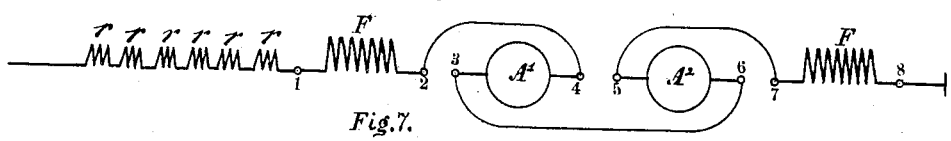

In Fig. 1 the magnets B B', together with levers 2 5 6 and the contacts 3 4 7 3, represent the main switch of the motor-controller. This switch is arranged so that when B is energized the levers are drawn upward and connect the motors so as to run in one direction, while if B' is energized the levers are depressed and the motors are connected so as to run in the opposite direction. The switches actuated by the magnets L L', N N', M, and P are for the purpose of changing the connection of the motors from series to parallel. The magnet Q actuates the car-brakes. The switches C D E F H I are for the purpose of cutting in or out the starting resistance in the motor-circuit, and this resistance is designated by R. The magnet J, with rotating armature, is a current-regulator, and its office is to prevent the movement of switches C to I too rapidly when the car speed is accelerating. The magnet K is a cut-out to open the circuit through the motors if the current becomes dangerously strong. The lines 13 14 15 16 represent wires that serve to connect the master-switches 68 with the controller-switches. These line-wires run to couplings at the ends of the car, so that they may be connected with similar wires on the other cars of the train. The current for operating the motor-controlling switches is drawn from the trolley-wire T through wire 69'. In the diagram two master-switches 68 are shown, one being located at each end of the car, and these are connected with 69' by wires 68'. The switch 66 is for the purpose of reversing the direction of rotation of the motors. The indicator 63 is for the purpose of indicating when the motors on any particular car of the train are cut out. The switch 64 is for the purpose of cutting the motors back into the circuit without stopping the train. The switches 64 and 66 in addition to serving for the purpose just named also provide means for rendering any or all of the indicators 63 and master-switches 68 inoperative by disconnecting them from the circuit. If a train is made up of, say, four cars, the line-wires 13 14 15 16 of all the cars will be connected with each other, and there will then be eight master-switches, eight 64 and eight 66 switches connected in the lines in the same manner as those shown in Fig. 1. Each car will be provided with a trolley to connect its motors with the line generally. If not, the wire 69' will be extended throughout the length of the train, and the wire $t$ of each car will connect with it, as will also the master-switch wires 68'. With either of these arrangements all the motors of the train can be operated from any one of the eight master-switches. As it is necessary that the train be operated from one point only, the switches 64 and 66 will be closed at that point and will be left open at all the other master-switches. Let us suppose that the train is operated from the master-switch at the left and that switch 66 is turned so as to connect with line-wire 14. Then as soon as master-switch 68 is turned so as to connect with contact 67 current will pass to wire 15 and then through 48 to brake-magnet Q and through 48' to ground-wire $g'$. Thus the brake-magnet will be energized, and the brakes will be removed, so that the train will be in condition to start as soon as the current is turned onto the motors. If the motorman now moves 68 to the second step, it will connect with the contact at the end of resistance 66' and the current will pass to junction 69, to switch 66, wire 14, and wire 17. Through the contact of lever 61' the current will flow to wire 19, to 21, and through magnet B to wire 42, and through the switch-contacts at 43 to wire 41, and thus to $g'$. The magnet B being energized will draw up the levers 2 5 6, connecting them with 3 4 7, respectively. The circuit through the motors will now be closed in series as follows: from trolley-wire $t$ to $a$ and through the resistances R R R R R to 1 and through the wire connection to terminals 1 of the field of motor A', through the field to terminal 2, and through wire 2 to J, thence through 2' to lower coil of K and through 2'' to lever 2 of main switch B B'. From lever 2 the circuit will continue to contact 3 and through the wire to contact 3 of motor A', through the armature to 4, and thence to contact 4 of switch B B', from here through lever 5 to the contacts 5 5 of switch M, to contact 5 of switch N N', and to armature-terminals 5 of motor $A^2$, through the armature to terminal 6, and thence to contacts 6 6 of switch P, and thus to lever 6 of switch B B', through lever 6 to 7, and thus to field of motor $A^2$ and through the field to ground-wire $g$. This will give the connection of motors and starting resistance shown in Fig. 3. It will be noticed that when magnet B draws up the switch-levers lever 2 will slide off the contacts 43, and thus cut a resistance 50 into the circuit of B. At the same time lever 6 will slide over contacts that connect wire 31 with wire 19, and thus permit current to pass to magnet C and through the latter to wire 40 and to ground. In this way C becomes energized, but not until after B B' has moved to an active position. As soon as C is energized it will lift its plunger and cut out one of the resistance-sections R, and at the same time, through the connecting-plate $i$, wires 25 and 26 will be connected, thus permitting current to flow through magnet D. The wire 25 runs to the right-side contact 32 under plate $e$ of magnet I and through this plate to the other contact 32 and thence by wire 36 to 25', which connects with wire 24 between the small contacts of switch N N'. At switch L L' wire 24 is connected with 24' through the insulated center section of lever $b$, and wire 24' is connected through the center insulated section of lever 1 of switch N N' with wire 41', which latter is connected with ground-wire $g'$. Thus it will be seen that as soon as magnet C lifts its plunger the circuit through D is closed. This magnet will now lift its plunger and cut out another R section of the starting resistance and will also cut into circuit-magnet E by closing the gap between wires 26 and 27. In like manner the switch-magnets F H I will be actuated one after the other. When I is energized, plate $e$ is lifted from contacts 32 32, and resistance 49 is cut into the circuit of magnets D to I. Plate $i$ connects contacts 33 33, and thus closes the circuit between wires 33 and 45, so that a continuous circuit through magnet L' is established, as follows: from 19 through 21' to L' to wire 34 to 33', through insulated end of lever $b$ to wire 33 and thence through contacts 33 33 to wire 45 and ground. From this it will be seen that the circuit through L' is open until magnet I has lifted its plunger. Hence L' cannot act until all the resistances R have been cut out of the motor-circuit. Even at this stage L' cannot act because the current passing through it is not strong enough; but if now the motorman advances the master-switch 68 to the last step the current from 68' will pass directly to wire 66", and thus cut out resistances 66'. In this way the current will be increased sufficiently to energize magnet L' and draw down lever b. The downward movement of b will break the connection between 33 and 33'; but at the same time the insulated center section of the lever will connect the three small contacts at the lower side of the switch, and in this way 34 will be connected directly with 24' and with ground in the manner already explained—that is, through wires 41' and 41. The connection between wires 24 and 24' will be broken by the downward movement of b, so that the switches D to I will be rendered inactive. The portion of b that slides over contact 4 is connected with the pivoted end of the lever and is insulated from the other parts, so that through this connection 4 will be connected with 8, thus giving the circuit connections shown in Fig. 4. From wire 21' wire 22 branches off and leads to magnet-switch M, returning from the latter through 22' to one of the lower small contacts of switch L L' and through the insulated section of b to wire 24 and to ground. In this way switch M becomes energized and lifting its plunger opens the circuit between the contacts 5 5, thereby disconnecting 4 and 5, which will give the circuit connections shown in Fig. 5. The magnet N of switch N N' derives current from wire 19 through 21", which passes to 35, and as soon as M acts the lifting of its connecting-plate joins 35 with 22', thus energizing N and lifting lever 1. In this way 1 and 5 are connected, giving the full parallel connection of the motors, as shown in Fig. 6. As soon as lever 1 is raised its insulated center section connects wires 24 and 24', and thus the circuit through the magnets of switches D to I is reëstablished, and the process of cutting out the resistances R will begin.

Figure 3:
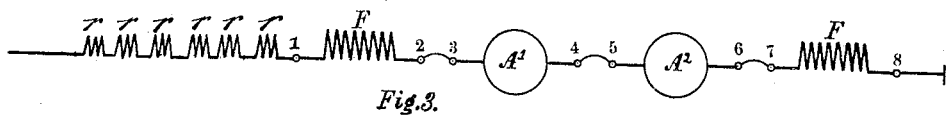
Figure 4:
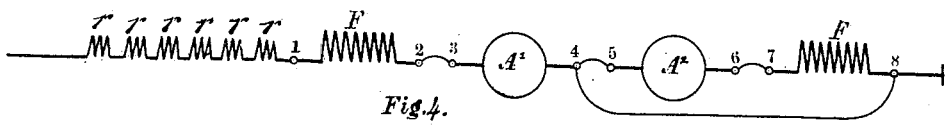
Figure 5:
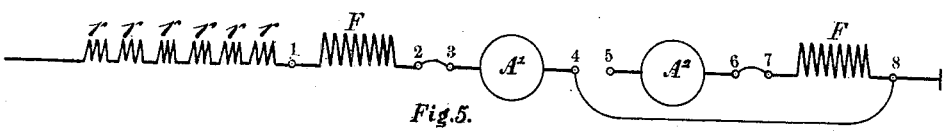

Fig. 3 shows the motor-circuit connections made as soon as the main switch B B' has been moved by the action of B. The magnet-switches C to I then begin to act and cut out the R resisistances one by one, leaving the motors in the circuit connected in series with all the starting resistance cut out. In this condition the train can run for any length of time. If the motorman desires to increase the speed, he advances the master-switch to the last step, and then magnet L' of switch L L' draws down lever b, and thus effects the connection of Fig. 4 and at the same time cuts the starting resistance, with the exception of the section controlled by C, back into the circuit. This resistance remains in the circuit until switch N N' has been moved, when it is again gradually removed. The current after passing through the field of motor A' traverses the magnet of the current-controller J. The torque of the armature of this controller is resisted by the spring 60", which is provided with means for adjusting its resisting force, consisting of the screw 60', so that it can be set to act for any current strength desired. In increasing the speed of the motors, either in starting or when passing from the series to the parallel connection, if the current exceeds the strength for which it is adjusted the lever 61 will be rotated to the right, thus drawing 58 with it, and thereby moving the levers 59 over the upper ends of the plungers of the switches C to I. In this way the movement of these switches will be prevented until the current strength drops to the proper point. As the switches can act rapidly, it might be possible for several of them to be lifted before J could draw 58 into position to bring levers 59 over the tops of the plungers. To obviate this difficulty, I place dash-pots d or some other retarding device on each switch-plunger, so that the time required for the switch to lift may be adjusted. In this way the movement of the switch-plungers can be made so slow that if the current rises above the maximum for which J is adjusted the levers 59 will be brought into position before another switch is lifted. It will be seen that the levers 59 are drawn to the right by means of springs, so that if one or more of the switch-plungers have been lifted before J acts the 59 levers above these will simply bear against the side of the upper end of the switch-plunger, and as 58 moves to the right they will bend backward and elongate the spring. From the foregoing it will be seen that J acts to keep the current from exceeding the desired strength when the speed is being accelerated by preventing the resistance-cutting-out switches from moving too quickly. The cut-out K is adjusted so that the torque of the armature becomes sufficient to lift lever 61' when the current strength reaches a point that is regarded as dangerous, and this will be a strength somewhat greater than that to which J is adjusted. When the current becomes great enough to actuate K, the lever 61' will rise and connect wires 46 and 46', and then the current flowing in train-wire 15 will pass through the indicator 63 by way of wire 65' and through closed switch 64 and wire 65 will reach line-wire 16 and passing through the resistance 53 will enter wire 46" and flowing through the top coil of K will reach 46 and ground at 8. The current flowing through this path will be sufficient to hold the lever 61' of K up even after the current through the lower coil stops. The lifting of lever 61' will break the circuit between 17 and 19, and thus shut off the current from the main switch B B', as well as all the other switches. All the switches will therefore return to the normal position, and the circuit through the motors will be opened. If the motors that are cut out by K are on the same car as the indicator 63, the current passing through the indicator will have to pass through only one 53 resistance. Hence the pointer will swing through a wide angle to the position 1. If the motors are on the car adjoining the one from which the train is operated, the current passing through 63 will have to traverse three 53 resistances. Hence it will not be so strong, and the pointer will not swing so far, but will stop at the point 2. If the cut-out motors are on the third car, the current through 63 will traverse five 53 resistances, and if on the fourth car it will pass through seven 53 resistances. Thus it will be seen that the strength of the current that passes through the indicator 63 will vary with the position in the train of the car upon which the cut-out motors are mounted, and as the pointer of this instrument can be adjusted so as to swing to positions corresponding with the current strength its position can be utilized to indicate the car on which the cut-out motors are located. As the train is generally operated from the front car, this car would be No. 1, and if its motors were cut out the pointer of 63 would swing to 1. If the cut-out motors were on car No. 3, the pointer would swing to 3, and so on for any other car. It sometimes occurs that the motors are cut out not because there is anything wrong, but simply because in accelerating the speed with an extra heavy load the current rises above the strength for which the cut-out is set. In such cases if the motors are cut into circuit after the train is under way they will run with the proper amount of current. With the arrangement here shown if the motorman desires to cut the motors back into circuit all he has to do is to open switch 64. In this way the current through the upper coil of K is cut off, and lever 61' drops and connects 17 with 19, and thus the switch B B' is moved. If there is a defect in the motor, it will be cut out again, but not otherwise. If the motorman opens switch 64 to ascertain whether the motors are in running condition, he should close it again in a second or two, and if the motors are cut out again the indicator will denote the fact, and, furthermore, they will remain cut out so long as switch 64 remains closed. If the motorman desires to reverse the direction of the train, he first returns the master-switch to the stop position and then swings switch 66 over so as to connect with line-wire 13. Then when the master-switch is advanced the current will flow into the controlling-switch circuits through wire 18, and the levers of B B' will be drawn downward by the action of B', and the motors will be connected in the way shown in Fig. 7. The resistance-cut-out switches C to I will act in the way already explained, and in passing from the series to the parallel connection lever b of switch L L' will be drawn upward by L and will connect 3 with 8. Switch P will then be energized and will open the circuit between 6 and 7, and finally switch N N' will be actuated, lever 1 being depressed by the action of N', thus connecting 1 with 6. The connections effected in the circuits of the switches will be the same as explained for the forward motion, with the exception that the current will flow through L and N' and P. When the switch N N' acts, it cuts the resistance 51 into the circuit of the magnets L L', N N', M, and P, thus cutting down the current to a strength that is just sufficient to hold them in the active position. If now the motorman returns the master-switch to the second position, the resistance 66' will be cut in, and this will so weaken the current that the three switches L L', N N', and either M or P will not be able to remain in the operative positions, but will return to the central position in which they are drawn, and the motors will be returned to the series connection. If the master-switch is moved back to the first step, the current through main switch B B' will be cut off, but the brake-magnet will remain energized, so that the brakes will not go on. Hence the train will be able to drift along under the impulse of its momentum.

In the foregoing I have shown what the operation is if the motorman moves the master-switch slowly from step to step; but he is also liable to move it instantly to the last step. In such an event that system would take care of itself, and the motors would accelerate as fast as the action of the current-controller J would permit and after reaching the full series position would pass to the parallel connection. That such is the case can be understood from what follows. Suppose the master-switch is moved at once to the third and last step. Then as contact 67 is the first one to receive current the brake-magnet Q would be the first to act and lift the brakes. Immediately after the current flowing through one of the magnets of B B' would actuate this switch and close the motor-circuit, connecting the motors in series, with all the R resistances in circuit. The switch L L' will not move, because the circuit through its magnets is not closed until switch I lifts its plunger. The switches N N', M, and P cannot act until L L' acts, because their circuits are not closed until this switch moves into an operative position. This being the case, after B B' moves the switches C to I will go on acting one after the other at a speed that will depend upon the adjustment of the dash-pots d and the controller J. After I has acted L L' will act and perform the first circuit change in passing from series to parallel connection of the motors. Immediately after L L' has acted one or the other of the switches M P will act and effect the second circuit change in passing to the parallel connection. Immediately after this switch has acted N N' will act and effect the last change in circuit connections required to obtain the parallel connection. The switches D to I will now once more come into action and cut out the resistances R as fast as the dash-pots $d$ and the controller J will permit. If the motorman desires to accelerate the velocity of the train as rapidly as possible, he will throw the master-switch to the last step at once, as this will give the highest rate of acceleration that the system is capable of, and this should be adjusted so as to be the highest practicable rate. If the motorman desires to accelerate at a lower rate or to not run the train at full speed, he passes the master-switch to the second step and holds it there until he desires to increase the velocity, when he advances to the last step.

The resistances 49 and 50 are not essential and in reality form no part of my invention. They are commonly used in connection with electromagnetic switches to cut down the current strength after the magnet has moved the switch to the active position, and they are so used here; but the means employed for cutting them in and out of the circuit are especially applicable to the system here shown and, so far as I know, are new. The resistance 51, while not absolutely necessary, serves a very important purpose and acts to make the operation of the switches in returning from the parallel to the series connection more certain. When this resistance is cut into the circuit, the current passing through the magnets L L', N N', and P or M, whichever one may be in service, is cut down to a point where it is just enough to hold the switches in the active position. Hence when the master-switch is moved back to the second step and it cuts in resistance 66' the current strength is so far reduced that it cannot hold these switches in the active position. They therefore drop and establish the series connection of the motors.

The switches B B' L L' N N' are to be made so that when the current is cut off the levers return to the central or inactive position in which they are drawn. There are many ways in which switches are made to accomplish this result. In some cases springs of various forms are used that exert a tension to hold the lever from being moved in either direction from the central position. In other cases the resisting force is gravity, an arm being suspended from one of the levers at the pivoted end provided with a weight sufficient to bring the levers to the central position. I have not shown any particular arrangement for bringing the switches to the central position, because the construction of the switches is not a part of my invention. It can be used with switches of any construction, provided they perform the functions here explained.

Figure 8:
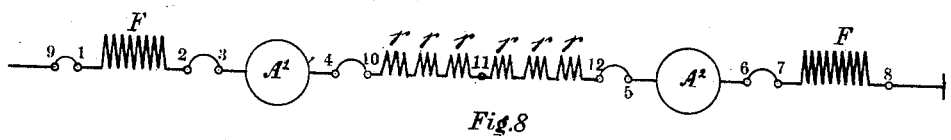
Figure 9:
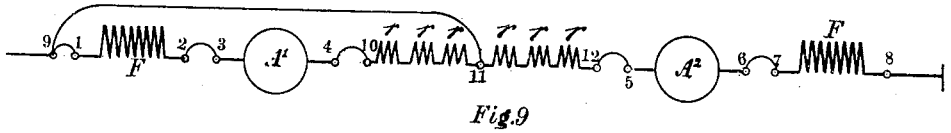
Figure 10:
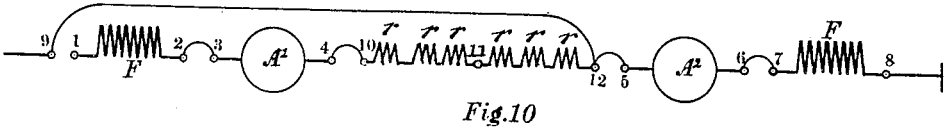
Figure 11:
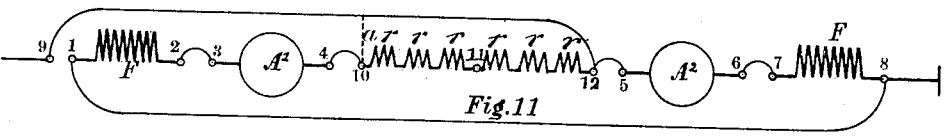
Figure 12:

Fig. 2 shows my invention applied to the operation of motors connected in the circuit in an order somewhat different from that used in Fig. 1. The difference in the connections is shown in Figs. 3 and 8. In the first of these figures it will be seen that the starting resistance is placed at the positive end of the line, while in the second it is placed between the two motors. Owing to this difference in the location of the starting resistance the switches required to effect the changes from the series to the parallel connection are different, so that the functions of switches L L', N N', M, and P of Fig. 1 are performed in Fig. 2 by the switches S V W U. The separate line-wire 15 used in Fig. 1 to energize the brake-magnet is omitted in Fig. 2. The independent cut-out K of Fig. 1 is replaced by a switching arrangement K, which is actuated by the current-controller J. This controller is shown in a different form, so as to illustrate more fully the fact that my invention is not restricted to any particular construction. The master-switch at the right is arranged so that if released when in any position it will return to the stop position. This is a construction of master-switch that is commonly used. The master-switch at the left is not arranged so as to return to the stop position. My invention can be used with either type of master-switch. In Fig. 2, as well as in Fig. 1, an independent reversing-switch 6 6 is shown; but it can readily be seen that the master-switch can be made so that if turned in one direction it will connect with line-wire 13 and if turned in the other direction it will connect with line-wire 14. Master-switches of this type are made in various forms and can be used in connection with my invention as well as the non-reversing form here shown. In Fig. 2 the switches 64 and 66 are shown closed at the right side of the diagram, while those at the left are open. In operating a train of cars all the switches would be in the open position, as shown at the left, except those at the front end of the front car, and these would be closed, as shown at the right side of the diagram. With the switches 64 and 66 in the position shown at the right if the master-switch 68 is turned to the first step the current from 68' will pass through resistance 66' to wire 13 and thence through 18 to 83' and through the upper coil of brake-magnet Q to 84 on ground-wire $g'$. The current will not pass through wire 19 to B, because wire 41' is disconnected from 41" at the magnet-switch Q. Thus it will be seen that the brake-magnet must act and release the brakes before the current can pass through the main controller-switch. As soon as magnet Q raises its plunger the lever will pass down over the contacts 88, and thus close the circuit through B, permitting the current to flow from 19 to 21, through B to 42, through contacts 43 to 41, 41', 41", and ground $g'$. Although the current will now be passing through B, it will not lift up the levers, because it is not strong enough; but if the master-switch is passed to the second step, so as to turn the current through resistance 66", which is smaller than 66', the current strength will become great enough to enable B to lift the levers, so as to connect 2 with 3, 10 with 4, 6 with 7, and 5 with 12. The current will now flow through the motor-circuit as follows: From T through *t* to 9, to contacts of switch U to wire 1, to contact 1 of motor A', through the field to 2, through wire 2 to lever 2 of main switch, to contact 3 through wire to terminal 3 of motor A' through to terminal 4 and to contact 4 of switch, through lever 10 to terminal 10 of starting resistance, through R R R R R R to 12 and to contact 12 of switch, through lever 5 to terminal 5 of motor A'' to terminal 6 and lever 6 of switch, through the lever of contact 7, to wire 7' through J to 7'' and to terminal 7 of motor A'' through the field to 8 and to *g*. This, as will be seen, will give the connections shown in Fig. 8. The action of the switches C to I will be the same as in Fig. 1. The circuit through the magnets of these switches is controlled by the extension of lever 6 to the right and the contacts it covers when in the operative positions, the arrangement being the same as in Fig. 1. To reach wire 31, the current must pass through wire 70 and contacts 33 34 of switch S, so that when this switch is raised the circuit is broken and the switches C to I become inoperative. In Fig. 1 the circuit through C is not effected, as the break is made in wire 25; but, as can be seen, the connections of Fig. 1 can be applied to Fig. 2 and those of Fig. 2 can be applied to Fig. 1. Furthermore, if it is desired to arrange the circuits so that C, D, and E or any number of the switches may not be cut out by the movement of S in one case or of L L' in the other it can be done without departing from my invention. The principal object of cutting resistance back into the circuit when passing from the series to the parallel connection is to prevent too sudden an increase in the speed of the motors, which would result in giving the train a jerky motion. The amount of resistance that must be reintroduced into the circuit to effect this result may be the whole of the starting resistance or only a part of it. If it is found that all the starting resistance is more than is required, then all the switches C to I will not be cut out; but C, or C and D, or any other number can be connected in the permanent circuit formed by wires 31 and 40 in Fig. 1. It will thus be seen that the number of switches C to I that must be cut out by the movement of the first switch that effects the change from series to parallel connections is governed by the effect produced upon the speed of the motors. Hence the connections of Fig. 2 may be used, or it may be necessary to follow that of Fig. 1. When the I switch is lifted, the *e* plate connects contacts 33 33 and the wires 33' and 89' are connected and current can pass from 70 to 72 to 73 and through magnet of S to 74, to 81, 82, through lower plate of W to ground-wire *g'*. The circuit through S will now be closed; but the magnet will not lift its plunger, as the current is too weak. If, however, the master-switch is moved to the last step, so that the current may pass through wire 69, the reduction in the resistance will cause the current to increase enough to actuate S and connect 9 with 11, giving the connections shown in Fig. 9. The upward movement of S will disconnect contacts 33 and 34, but will connect 33 with 90, and thus maintain the circuit through S closed. The upper plate of S will connect wires 74 and 75, and thus energize U and break the connection between 1 and 9. As soon as U is raised it will connect 74 with 78, and thus energize V. The upward movement of V will break the connection between 11 and 11 and at the same time connect 9 with 12, giving the connections shown in Fig. 10. The lifting of V will connect wires 80 and 76, and thus energize W, thereby connecting 1 with 8 and obtaining the parallel connection, as shown in Fig. 11. When W is raised, wire 71 is connected with 72, and then current can pass to wire 31 and energize the C to I switches. These switches will now act one after the other and cut out all the resistance, leaving the motors in the circuit with the resistance short-circuited, as indicated by the broken line *a* in Fig. 11. When W is raised, it also cuts the resistance 51 into the circuit of switches S V W U, and this reduces the current strength to a point where it is just sufficient to hold the switches up. If now the master-switch is moved back to the second step, the resistance 66'' is cut in and the current becomes so weak that the magnets cannot hold up the S V W U switches. Hence the motors are returned to the series connection. As already explained, when the main switch B B' moves the contacts at 43 are uncovered and resistance 50 is cut into the circuit of B and B' and the current is reduced to a point where it is just enough to hold the levers in the active position. Hence if the master-switch is returned to the first step the introduction of resistance 66' into the circuit will cut the current down to such an extent that the main switch will swing back to the open position, but the brake-actuating magnet Q will remain up, as it is adjusted to a weak current, so that the train will run along under the acquired headway. If the master-switch is thrown instantly over to the last step, the controlling-switches will move in the proper order and at the proper rate, because the main switch B B' can get no current until Q has acted, and the S switch can get no current until I has acted, and switches V W U, as just explained, are dependent upon each other and cannot act except in their proper order. To avoid sparking when returning from the parallel to the series connection, it is desirable that switch W act first, so as to avoid short-circuiting the line by the dropping of U, which would connect 1 and 9. To insure that W will drop before U, a spring X to draw it open can be provided, as shown. As U acts by gravity alone, it will drop later. Switch V should drop after U, so as to avoid opening the circuit. Hence it is preferably provided with a retarding device, such as a dash-pot Z. In Fig. 1 switch L L' should act first and N N' last, or the order may be reversed; but the M and P switches should act between the other two. Hence one of the first-named switches can be provided with a speed-retarding device and the other with a speed-accelerating device, so that one will act ahead of M or P, whichever one of these is in use, and the other after it. These retarding and accelerating devices are not absolutely necessary. They are desirable, as they reduce the sparking; but both can be left off, or either one may be used alone.

In Fig. 2 if the current increases too much J will draw 58 to the right in the same manner as already explained in connection with Fig. 1, and if the current becomes dangerously strong 61 will swing far enough around for its end 87 to strike the arm of K, and thus swing lever 62 off the contact under it and upon those drawn to the left, and thus break the circuits 19 and 20 and connect 17 and 18 with the circuit through magnet 85. In this way the motors will be cut out just the same as by the separate cut-out K of Fig. 1, and the circuit through indicator 63 will be closed, so that the number of the car upon which the motors are cut out may be shown. The magnet 85 will attract the armature 87' on the end of 62 only so long as 64 remains closed. Hence by opening 64 the motors can be cut back into the circuit, if desired. As already explained, the resistances 53 can be used to cause the indicator 63 to point to the number corresponding to the car on which the motors are cut out. These resistances, however, can be dispensed with and other resistances inserted in the connection running from 85, as shown at 86. When resistances are placed in this position, they must be made of different magnitudes for the different cars to swing the indicator to the proper position, for in such an arrangement the current would pass through one resistance only, no matter on what car the motors might be located. The current for operating the controller-magnets in this diagram is derived from the storage battery 91. When the resistances 53 are used, the wire running from the cut-out device must be connected with line 16 between the two resistances, so that if the cut-out motors are on the car on which the indicator is located the current will have to pass through one of the resistances, no matter at which end of the car the indicator may be. The resistance 50 in Fig. 1 serves no purpose other than to cut the current down after the magnet has moved the switch; but in Fig. 2, as will be seen, it acts in the same manner as 51—that is, to insure the proper action of the switch in returning from series to open-circuit position—by so reducing the current strength as to make it certain that the switch will move to the open position.

The brake-magnet Q is wound with two separate coils, so as not to interfere with the reversing of the motors. If the wires 83 83' were joined before entering Q, the current would pass from one to the other, and thus the two coils B B' would be energized whether the current entered through wire 17 or 18. With the arrangement shown when current enters through wire 18 it will pass through B and lift the levers, as already explained, connecting the motors, as in Fig. 8, and through 83' it will pass to the upper coil on Q and then to ground. When 66 is reversed and the current enters through 17, it will pass through B' and draw down the levers, giving the connections shown in Fig. 12. It will now flow to the lower coil of Q, through wire 83, and through the coil to ground. The magnet Q can be used to operate any type of brake either directly or indirectly. At the present time the common practice is to use air-brakes, and when Q is used in connection with these its office will be to open and close the valve or valves that control the action of the brakes. If the train is equipped with magnetic brakes, Q can represent the magnet or magnets that operate the brakes, or it may act as in the case of the air-brakes—that is, to open and close the switch or switches that control the action of the brake-moving magnets. If Q moves the valve of an air-brake or the switch of a magnetic brake, it can be small and can be actuated by a small current, as it will have little work to do; but if it moves the brakes directly it will have to be much larger and will have to be traversed by a stronger current, as it will have more work to do. Thus it will be seen that the only change required in Q to adapt it to either case is in size, the general principle of operation remaining the same.

In the B B' switch the levers must be insulated from each other if a construction similar to that here shown is used. I have therefore indicated insulated separations in the plunger, so as to render more clear the path of the currents through the switch; but it is to be understood that it is not intended that this construction be regarded as a feature of my invention, as the switch B B' can be made in many different forms. The above explanation applies to all the other switches shown in the diagrams and also to the bar 58 and levers 59, which in the diagram serve to show clearly the manner in which J stops the movement of the plungers of the solenoid-magnet switches C to I. These switches, however, can be made in several other forms, and with each form 58 and 59 would have to be modified. I do not claim any special construction of the mechanism by means of which J stops the movement of the switches, but simply the arrangement whereby the motion of J is used to arrest the motion of the C to I switches whenever the strength of the current through the motors renders such interference necessary.

In Fig. 2 it will be seen that every operation of the motor-controlling switches, as well as the operation of the brake-magnet Q and the cut-out K, is accomplished by current derived from a single line-wire, either 13 or 14, and that this current is caused to actuate the proper devices by varying its strength by the introduction of resistances 66' and 66'' into the circuit by the movement of the master-switch, and that the action is rendered more positive by the introduction at the proper times of the resistances 50 and 51 in branch circuits derived from either 13 or 14. It will also be seen that the switches that perform different portions of the operations required to start, accelerate, slow down, and stop the motors are connected in the circuits in such relation to each other that they must act in the proper sequence, regardless of whether the master-switch is moved step by step or to the final position in one movement. In Fig. 1 the motor-controlling switches and the cut-out K are actuated by current derived from a single line-wire, either 13 or 14; but the brake-magnet Q is in an independent circuit. I do not claim that the independent circuit for the magnet Q and the special line-wire 15 form a part of the invention here explained and claimed; but I have shown this arrangement in Fig. 1 to make clear the fact that my invention can be applied to a portion of the total train or car-controlling apparatus as well as to the whole.

In Fig. 2, as well as in Fig. 1, it will be noticed that the circuits are so arranged that if the cut-out K acts it does not stop the flow of current through the brake-magnet Q. This arrangement is necessary, so as to prevent the brakes from being applied under such conditions, for if they were the motors on the remaining cars would not only have to propel the train, but in addition would have to overcome the friction of the brakes on the disabled car. Hence cutting out the motors on a car would practically disable a train.

When switches are used in connection with strong currents or high electromotive forces, it is common practice to provide a number of pairs of contacts, so as to break the circuit at several points, and thus reduce the size of the breaking spark. These contacts are connected sometimes in parallel, so as to reduce the strength of current at each break, and sometimes in series, so as to reduce the electromotive force acting at each break. In other cases the contacts are arranged both in series and in parallel. It is also customary to provide magnetic blow-outs to reduce the sparking. In Figs. 1 and 2 I have not shown such arrangement, as they would only serve to complicate the diagram; but, as can plainly be seen, they can be readily applied, and I contemplate using them whenever the currents handled are of such magnitude as to require them. The additional contacts can be operated by adding them to the switches shown in the diagrams, or each one of these switches can be replaced by a number of magnetic switches, each one of which can be arranged to actuate one or more pairs of contacts—that is, so as to control one or more of the circuit-breaking points. If each one of the magnetic switches shown in Figs. 1 and 2 is replaced by a group of magnetic switches and these groups are connected in the circuits in the same order as the individual switches here shown, the principles of my invention will not be departed from in any way.

In Figs. 1 and 2 it will be noticed that the B B' switches, as well as the switches that effect the change from series to parallel connection of the motors, are not arranged in the same manner—that is, they do not make the same circuit connections. These differences are due to the fact that the motors and starting resistance are not connected in the circuit in the same order (see Figs. 3 and 8) and the changes in circuit connections by means of which the motors are passed from series to the parallel relation are not the same. There are several other ways in which the motors and starting resistance can be connected in the circuit, and there are several other ways in which the circuit connections can be changed in passing from the series to the parallel connection of the motors. From this it can be plainly seen that the switches that constitute the motor-controller may be modified in many ways. These modifications, however, will not in any way interfere with the application of my invention, as its object is to properly operate the motor-controller by the movement of the master-switch in the manner described in the foregoing, without any regard to what the construction of the controller may be.

The series-parallel method of control need not be used, the changes in speed being obtained in other ways. Whatever the type of the motor may be and whatever the method of control, the controller will have to be arranged so as to perform its proper function, and to fulfil the requirements of my invention the magnets that operate the switches that constitute the controller will have to be connected with the circuits controlled by the master-switch, with each other, and with the contacts of the controller-switches in such manner as to make the switches or sets of switches that perform the successive operations interdependent, so that the second set of switches cannot come into action until the first one has completed all its operations, and the third set cannot come into action until the second set has completed all its operations, and so on for all the sets of switches that constitute the controller.

In Fig. 13, in which the system has been applied to a train of cars, the circles 100 represent the entire controller, a complete reproduction being unnecessary, as reference can be made to the other figures. The parts 101 represent cables connecting the controller with the motors, all the conductors being carried within these. The parts 102 are couplings located at each end of each car to connect the conductors of the whole train. All the other parts are marked the same as in Fig. 1. The reversing 66 and indicator switches 64 are open, except at the left end, so that the latter is the only point from which the motors can be controlled. It will be seen that if the two motors at the left are cut out one of the resistances 53 will be included in the indicator-circuit, and if the two motors on the right are cut out there will be three of the resistances 53 in circuit.

Having described my invention, what I claim is—

1. In a motor-controlling system, the combination of a master-switch; a controller consisting of electromagnetic switches, independently connected, and arranged to act in succession with progressively-increasing energizing-currents; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

2. In a motor-controlling system, the combination of a master-switch; a controller consisting of electromagnetic switches some of which control the motor-circuits, and others of which vary the resistance in said circuits, the magnet-circuits of the last-named controller-switches being controlled by the first-named controller-switches; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

3. In a motor-controlling system, the combination of a master-switch; a controller consisting of electromagnetic switches that control the motor-circuits and cut out resistance from said circuits, the magnetic switches being opened and closed by the switches in the order required to effect a proper movement of said switches; conductors connecting the magnets of the controller in proper relation and terminating in one wire for each direction of rotation of the motors; and conductors connecting the controller-circuit terminals with the master-switch, and said master-switch being adapted to connect the terminal wires of the controller-magnet circuit with a source of electric energy and to reduce progressively the resistance in these circuits.

4. In a motor-controlling system, the combination of a master-switch, a controller consisting of electromagnetic switches that close the motor-circuits for each direction of rotation, and other electromagnetic switches that move in succession to cut out the starting resistance, the magnet-circuits of all the last-named controller-switches being controlled by the first-named controller-switches, conductors connecting the magnets of the controller in proper relation and terminating in one wire for each direction of rotation of the motors, and conductors connecting the controller-circuit terminals with the master-switch; said master-switch being adapted to connect the terminal wires of the controller-magnet circuit with a source of electric energy and to reduce progressively the resistance in these circuits.

5. In a motor-controlling system, the combination of a master-switch, a controller consisting of electromagnetic switches, some of which cut resistance out of the motor-circuits, these switches being controlled by each other, the movement of one closing the magnet-circuit of the one that acts immediately after it; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

6. In a motor-controlling system, the combination of a master-switch; controllers consisting of electromagnetic switches which cut resistance out of the motor-circuits, mechanism that stops the movement of the cut-out switches when the motor-current becomes too strong, and a current-controlling magnet to operate said mechanism; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and with line-wires, arranged to move over a number of contacts and thereby to reduce, progressively, the resistance in the controller-magnet circuit.

7. In a motor-controlling system, the combination of a master-switch; a controller consisting of main switches to connect motors for either direction of rotation, cut-out switches to vary resistance in motor-circuits, other switches to change motor connections for varying their velocity, all these switches being operated by electromagnets, the first-named switches controlling the magnet-circuits of the second set, and the second set controlling the magnet-circuits of the third set; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

8. In a motor-controlling system, the combination with a master-switch; a controller consisting of groups of electromagnetic switches the first group acting to connect the motor-circuits for the desired direction of rotation, the other groups acting to vary the velocity of motors, and magnet-circuits of one group being controlled by the movement of the preceding group; conductors connecting the magnets of the controller in proper relation and terminating in one wire for each direction of rotation of the motors; and conductors connecting the controller-circuit terminals with the master-switch said master-switch being adapted to connect the terminal wires of the controller-magnet circuit with a source of electric energy and to reduce progressively the resistance in these circuits.

9. In a motor-controlling system, the combination of a master-switch; a controller consisting of electromagnetic switches that act in succession, the first ones moved acting to connect the motor-circuits for the required direction of rotation and to close the magnet-circuits of the second-acting switches, these second switches acting to vary the motor velocity and to close the magnet-circuits of the third-acting switches; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

10. In a motor-controlling system the combination of a master-switch; a controller consisting of electromagnetic main switches, electromagnetic resistance cut-out switches, and a current-controlling magnet to control the movement of the cut-outs; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

11. In a motor-controlling system, the combination of a master-switch; controllers consisting of electromagnetic switches which cut resistance out of the motor-circuits, retarding devices for said switches, and a current-regulating magnet that stops their movement when the current through the motors becomes too strong; conductors connecting the magnets of the controller in proper relation and terminating in one wire for each direction of rotation of the motors; line-wires connecting the circuit-terminals of the several controllers in parallel with each other and with the master-switch, said master-switch being connected with a source of electric energy adapted to connect with the line-wires, to advance step by step and as it advances, to reduce the resistance in the controller-magnet circuits.

12. In a motor-controlling system, the combination of a master-switch; a controller consisting of electromagnetic switches arranged to control the motors by acting in succession, the first-acting switches controlling the magnet-circuits of those acting after them; conductors connecting the magnets of the controller in proper relation and terminating in one wire for each direction of rotation of the motors; conductors connecting the controller-circuit terminals with the master-switch; said master-switch being adapted to connect the terminal wires of the controller-magnet circuit with a source of electric energy and to reduce progressively the resistance in these circuits.

13. In a motor-controlling system, the combination of a master-switch; controllers consisting of electromagnets which cut resistance out of the motor-circuits, mechanism that stops the motion of the cut-outs when the motor-current becomes too strong, the controlling-magnet having means to adjust it to act with currents of different strength, and adapted to operate said mechanism; conductors connecting the magnets of the controller in proper relation and terminating in one wire for each direction of rotation of the motors; and line-wires connecting the circuit-terminals of the several controllers in parallel with each other and with the master-switch, said master-switch being connected with a source of electric energy, and with the line-wires, through resistances, and adapted to cut out these resistances as it advances step by step.

14. In a motor-controlling system, the combination of a master-switch; controllers having resistance-cut-out switches, dash-pots for the resistance-switches to retard their movement in the direction that reduces resistance in the motor-circuits; conductors connecting the magnets of the controller in proper relation and terminating in one wire for each direction of rotation of the motors, and line-wires connecting the circuit-terminals of the several controllers in parallel with each other and with the master - switch, said master-switch being connected with a source of electric energy, and with the line-wires, through resistances, and adapted to cut out these resistances as it advances step by step.

15. In a motor-controlling system, the combination of a master-switch; controllers having resistance-cut-out switches, dash-pots for the resistance-switches to retard their movement in the direction that reduces resistance in the motor-circuits, and a current-regulating magnet, energized by the motor-current, that stops movement of cut-outs when motor-current becomes too strong; conductors connecting the magnets of the controller in proper relation and terminating in one wire for each direction of the motors; and line-wires connecting the circuit-terminals of the several controllers in parallel with each other and with the master - switch; said master-switch being connected with a source of electric energy and with the line-wires, and arranged to move over a number of contacts and thereby to reduce, progressively, the resistance in the controller-magnet circuit.

16. In a motor-controlling system, the combination of a master-switch; controllers having resistance-cut-out switches, retarding devices for the switches, mechanical means for stopping the movement of the cut-outs, and a magnetic current-controller energized by the motor - current and actuating the stopping means; conductors connecting the magnets of the controller in proper relation and terminating in one wire for each direction of rotation of the motors; and line-wires connecting the circuit-terminals of the several controllers in parallel with each other and with the master-switch, said master-switch being connected with a source of electric energy and with the line-wires, and arranged to move over a number of contacts and thereby to reduce, progressively, the resistance in the controller-magnet circuit.

17. In a motor-controlling system, the combination of a master-switch; controllers having magnetically-operated switches to change the motor connections from series to parallel, and retarding devices for some of the switches that act in returning from the parallel to the series connection; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and adapted to connect with either one of two of the line-wires, and to reduce the resistance in the controller-magnet circuits as it advances from first to last position.

18. In a motor-controlling system, the combination of a master-switch; controllers having electromagnetic switches to change the motor connections from series to parallel, and speed - increasing devices for some of the switches to accelerate their movement in changing from parallel to series connection; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy adapted to connect with the line-wires directly or through a reversing-switch, to advance step by step and as it advances to reduce the resistance in the controller-magnet circuits.

19. In a motor-controlling system, the combination of a master-switch; controllers having electromagnetic switches to change the motor connections from series to parallel, retarding devices for some of the switches and accelerating devices for other of the switches which come into action when the motors are returned from parallel to series connection; conductors connecting the magnets of the controller in proper relation and terminating in one wire for each direction of rotation of the motors; line-wires connecting the circuit-terminals of the several controllers in parallel with each other and with the master-switch; said master-switch being connected with a source of electric energy, and with the line-wires, through resistances, and adapted to cut out these resistances as it advances step by step.

20. In a motor-controlling system, the combination of a master-switch; controllers having electromagnetic switches which cut resistances out of the motor-circuits, and a main switch provided with contacts through which the magnet-circuits of the resistance cut-out are closed when main switch is moved to an active position; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy, and with the line-wires through two resistances and arranged to move over contacts and to cut out these resistances as it moves.

21. In a motor-controlling system, the combination of a master-switch; controllers having electromagnetic switches which cut resistances out of the motor-circuits, and a main switch having contacts to connect the main circuit of the magnets of the resistance cut-outs, the resistance first cut out having contacts through which the magnet-circuit of second resistance cut-out is closed, the second resistance cut-out having contacts to close magnet-circuit of third resistance cut-out, the latter being related in like manner to the fourth, this order being preserved to the last resistance cut-out; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy, and with the line-wires through two resistances and arranged to move over contacts and to cut out these resistances as it moves.

22. In a motor-controlling system the combination of a master-switch; controllers having electromagnetic switches which cut resistances out of the motor-circuits, the last resistance cut-out having contacts through which resistance is cut into the main circuit of the resistance-cut-out magnets when this last resistance-switch acts; conductors connecting the magnets of the controller in proper relation and terminating in one wire for each direction of rotation of the motors; and line-wires connecting the circuit-terminals of the several controllers in parallel with each other and with the master-switch, said master-switch being connected with a source of electric energy, and with the line-wires through two resistances and arranged to move over contacts and to cut out these resistances as it moves.

23. In a motor-controlling system, the combination of a master-switch; controllers having electromagnetic switches which cut resistances out of the motor-circuits and a main switch having contacts to close magnet-circuit of first resistance-cut-out switch this switch having contacts to close magnet-circuit of second resistance-cut-out switch, the latter having contacts to close magnet-circuit of third resistance cut-out, the remaining resistance cut-outs being arranged in like order; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and with the line-wires, and arranged to move over a number of contacts and thereby to reduce, progressively, the resistance in the controller-magnet circuit.

24. In a motor-controlling system, the combination of a master-switch; controllers having electromagnetic main switch and electromagnetic switches which cut resistances out of the motor-circuits, the last resistance-cut-out switch having contacts through which resistance is cut into the magnet-circuits of all the resistance cut-outs except those whose circuits are closed by the main switch; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and with the line-wires, and arranged to move over a number of contacts and thereby to reduce, progressively, the resistance in the controller-magnet circuit.

25. In a motor-controlling system, the combination of a master-switch; controllers having main switches, resistance-cut-out switches, and speed-varying switches, the main switches having contacts to control magnet-circuits of the cut-out switches, the cut-out switches having contacts that control magnet-circuit of first speed-varying switch, conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and with the line-wires, and arranged to move over a number of contacts and thereby to reduce, progressively, the resistance in the controller-magnet circuit.

26. In a motor-controlling system, the combination of a master-switch; controllers consisting of main switches, resistance-cut-out switches and speed-varying switches, the first speed-varying switch having contacts to control the magnetic circuit of the second speed-varying switch, the second speed-varying switch having contacts to control magnet-circuit of third speed-varying switch, and the remaining speed-varying switches being arranged in the same order; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy adapted to connect with the line-wires, to advance step by step and as it advances to reduce the resistance in the controller-magnet circuits.

27. In a motor-controlling system, the combination of a master-switch; controllers consisting of main switches, resistance-cut-out switches and switches to change connection of motors from series to parallel, the magnet-circuits of first series-parallel switch being controlled by last resistance-cut-out switch, the first series-parallel switch controlling magnet-circuit of second, the second related in like manner to the third and the third in like manner to the fourth; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy, and adapted to connect with the line-wires to advance step by step and as it advances to reduce the resistance in the controller-magnet circuit.

28. In a motor-controlling system, the combination of a master-switch; series-parallel controllers consisting of electromagnetic resistance-cut-out switches and switches to change the connection of the motor from series to parallel, the first series-parallel switch having contacts that control the circuits through all or a portion of the magnets of the cut-out switches whereby the movement of this switch to the active position returns the cut-outs controlled by it to the inactive position; conductors connecting the magnets of the controller in proper relation and terminating in one wire for each direction of rotation of the motors; the line-wires connecting the circuit-terminals of the several controllers in parallel with each other and with the master-switch; said master-switch being connected with a source of electric energy, and adapted to connect with the line-wires to advance step by step and as it advances to reduce the resistance in the controller-magnet circuit.

29. In a motor-controlling system, the combination of a master-switch; series-parallel controllers consisting of electromagnetic resistance-cut-out switches, and switches to change the connection of the motor from series to parallel, the first series-parallel switch having contacts that control the circuits through all or a portion of the magnets of the resistance-cut-out switches and other contacts to close its own circuit when in an active position and render it independent of last cut-out switch; conductors connecting the magnets of the controller in proper relation and terminating in one wire for each direction of rotation of the motors; and line-wires connecting the circuit-terminals of the several controllers in parallel with each other and with the master-switch, said master-switch being connected with a source of electric energy, and adapted to connect with the line-wires, to advance step by step and as it advances to reduce the resistance in the controller-magnet circuits.

30. In a motor-controlling system, the combination of a master-switch; a controller consisting of an electromagnetic main switch provided with contacts that are disconnected when the switch is in an active position and a resistance cut into the circuit of the main-switch magnet when the switch is in an active position; circuits connecting the magnets of the controller in proper relation and terminating in one wire for each direction of rotation of the motor; conductors connecting the controller-circuit terminals with the master-switch; said master-switch being adapted to connect the terminal wires of the controller-magnet-circuit terminals with a source of electric energy and to reduce progressively the resistance in these circuits.

31. In a motor-controlling system, the combination of a master-switch; series-parallel controllers consisting of electromagnetic resistance-cut-out and series-parallel switches, the first series-parallel switch when moved to an active position breaking the circuit through some of the magnets of the resistance-cut-out switches, and the last series-parallel switch when moved to an active position closing these circuits again; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy, and adapted to connect with either one of two line-wires and to reduce the resistance in the controller-magnet circuits as it advances from first to last position.

32. In a motor-controlling system, the combination of a master-switch; series-parallel controllers consisting of electromagnetic resistance-cut-out and series-parallel switches the last series-parallel switch being provided with contacts that are separated when said series-parallel switch moves to an active position and a resistance cut into the magnet-circuit of the series-parallel switches when in such active position; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and adapted to connect with either one of two line-wires, and to reduce the resistance in the controller-magnet circuits as it advances from first to last position.

33. In a motor-controlling system, the combination of a master-switch; controllers consisting of an electromagnetic main switch, a brake-actuating magnet, a switch closing the magnetic circuit of the main switch when the brake-magnet is moved to the active position, conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and adapted to connect with the line-wires to advance step by step and as it advances to reduce the resistance in the controller-magnet circuits.

34. In a motor-controlling system, the combination of a master-switch, controllers consisting of an electromagnetic main switch and a brake-actuating magnet, arranged to keep the main-switch magnet-circuit open, after the main controller-circuit is closed, until the brake-magnet moves to the active position; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy, and with the line-wires, through resistances, and adapted to cut out these resistances as it advances step by step.

35. In a motor-controlling system, the combination of a master-switch, controllers consisting of electromagnetic switches, a cut-out actuated by the motor-current, that breaks the circuit through the magnet-circuits of all the switches, and a retaining magnetizing-coil having its circuit closed by the cut-out and holding said cut-out in the cut-out position; conductors connecting the magnets of the controller in proper relation and terminating in contacts of the automatic cut-out; and line-wires connecting the circuit-terminals of the several controllers in parallel with each other and with the master-switch, said master-switch being connected with a source of electric energy, and with the line-wires through two resistances, and arranged to move over contacts and to cut out these resistances as it moves.

36. In a motor-controlling system, the combination of a master-switch, controllers consisting of electromagnetic switches, divided into groups of one or more switches, the groups arranged to act in succession, each group requiring more current to actuate it than the preceding group; conductors connecting the magnets of the several groups of switches in proper relation, the circuits of each group terminating in two wires, one for each direction of rotation of the motors; and line-wires connecting the circuit-terminals of the several controllers in parallel with each other and with the master-switch; said master-switch being connected with a source of electric energy and with the line-wires, and arranged to move over a number of contacts and thereby to reduce, progressively the resistance in the controller-magnet circuit.

37. In a motor-controlling system, the combination of a master-switch, a controller consisting of electromagnetic main switches, resistance-cut-out and speed-accelerating switches, the main and cut-out switches being arranged to be actuated by a current of the same strength, and this current being insufficient to actuate the accelerating-switches; conductors connecting the magnets of the controller in proper relation and terminating in one wire for each direction of rotation of the motors; and circuits connecting the controller-circuit terminals with the master-switch; said master-switch being adapted to connect the terminal wires of the controller-magnet circuit with a source of electric energy and to reduce progressively the resistance in these circuits.

38. In a motor-controlling system, the combination of a master-switch; a number of controllers each one consisting of electromagnetic switches, adapted to control one or more motors, conductors connecting the magnets of the controller in proper relation and terminating in two wires; and line-wires connecting the circuit-terminals of the several controllers in parallel with each other and with the master-switch; said master-switch being connected with a source of electric energy and with the line-wires, and arranged to move over a number of contacts and thereby to reduce, progressively, the resistance in the controller-magnet circuit.

39. In a motor-controlling system, the combination of a master-switch; a number of controllers each one consisting of electromagnetic switches, adapted to control one or more motors, and arranged to act in succession, conductors connecting the magnets of the controller in proper relation and terminating in two wires; and line-wires connecting the circuit-terminals of the several controllers in parallel with each other and with the master-switch; said master-switch being connected with a source of electric energy and with the line-wires, and arranged to move over a number of contacts and thereby to reduce progressively, the resistance in the controller-magnet circuit.

40. In a motor-controlling system, the combination of a master-switch; a number of controllers, each one consisting of electromagnetic switches, arranged in groups adapted to act in succession and control two or more motors in accordance with the series-parallel system; conductors connecting the magnets of the controller in proper relation and terminating in one wire for each direction of rotation of the motors; and line-wires connecting the circuit-terminals of the several controllers in parallel with each other and with the master-switch; said master-switch being connected with a source of electric energy and adapted to connect with either one of two line-wires, and to reduce the resistance in the controller-magnet circuits as it advances from first to last position.

41. In a motor-controlling system, the combination of a master-switch; a number of controllers, each one consisting of electromagnetic switches, divided into groups arranged to act in succession, the first acting group to close the motor-circuits, the second to cut out the starting resistance, and the remaining groups to change the motor connections from all in series to all in parallel; conductors connecting the magnets of the several groups of switches in proper relation, the circuit of each group terminating in two wires, one for each direction of rotation of the motors; and line-wires connecting the circuit-terminals of the several controllers in parallel with each other and with the master-switch; said master-switch being connected with a source of electric energy and adapted to connect with the line-wires, to advance step by step and as it advances to reduce the resistance in the controller-magnet circuit.

42. In a motor-controlling system, the combination of a master-switch; a number of controllers, each one consisting of electromagnetic switches, arranged to control one or more motors by acting in succession, the first acting switches connecting the motor-circuits for the desired direction of rotation, the second acting switches cutting out the starting resistance, and the other switches acting to accelerate the velocity; conductors connecting the magnets of the controller in proper relation and terminating in one wire for each direction of rotation of the motors; and line-wires connecting the circuit-terminals of the several controllers in parallel with each other and with the master-switch, said master-switch being connected with a source of electric energy, and with the line-wires through two resistances and arranged to move over contacts and to cut out these resistances as it moves.

43. In a motor-controlling system, the combination of a master-switch; a controller consisting of a main switch B B' resistance-cut-out switches C to I provided with retarding devices, switch I having contacts 32, 32 and 33, 33, conductors connecting the magnets of the controller in proper relation and terminating in one wire for each direction of rotation of the motors; and conductors connecting the controller-circuit terminals with the master-switch; said master-switch adapted to connect the terminal wires of the controller-magnet circuit with a source of electric energy and to reduce progressively the resistance in these circuits.

44. In a motor-controlling system, the combination of a master-switch; a controller consisting of a main switch B B', resistance cut-outs C to I, a current-controller J and a mechanism acted upon by the controller-mover to stop the movement of the cut-out switches; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

45. In a motor-controlling system, the combination of a master-switch; a controller consisting of a main switch B B', cut-out switches C to I, a current-controller, mechanism actuated by the controller, and an automatic cut-out K to break the controller-magnet circuit and thus cut out the motors; conductors connecting the magnets of the controller in proper relation and terminating in contacts of the automatic cut-out; and conductors connecting the controller-circuit terminals with the master-switch; said master-switch being adapted to connect the terminal wires of the controller-magnet circuit with a source of electric energy and to reduce progressively the resistance in these circuits.

46. In a motor-controlling system, the combination of a master-switch; a controller consisting of a main switch B B', resistance cut-outs C to I, and switches to accelerate the motor velocity, the magnet-circuit of these latter switches being controlled by I switch; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

47. In a motor-controlling system, the combination of a master-switch; a controller consisting of a main switch B B', resistance cut-outs C to I, and switches to change the motor connections from series to parallel, the magnet-circuits of these latter switches being opened and closed by switch I; conductors connecting the magnets of the controller in proper relation and terminating in one wire for each direction of rotation of the motors; and conductors connecting the controller-circuit terminals with the master-switch; said master-switch being adapted to connect the terminal wires of the controller-magnet circuit with a source of electric energy and to reduce progressively the resistance in these circuits.

48. In a motor-controlling system, the combination of a master-switch, a controller consisting of the main switch, the brake-magnet Q, a switch actuated by the brake-magnet to actuate the main switch, resistance cut-outs, a current-controller for making the cut-outs inoperative, an automatic cut-out operated to cut out all the switches; conductors connecting the magnets of the controller in proper relation and terminating in contacts of the automatic cut-out; and conductors connecting the controller - circuit terminals with the master - switch; said master - switch being adapted to connect the terminal wires of the controller-magnet circuit with a source of electric energy and to reduce progressively the resistance in these circuits.

49. In a motor-controlling system, the combination of a master-switch; a controller consisting of the main switch, resistance cut-outs, switches to change motor connections from series to parallel, the magnet-circuits of these being controlled by one of the resistance cut-outs, a current - controller for making the cut-outs inoperative, an automatic cut-out operated to cut out all the switches, conductors connecting the magnets of the controller in proper relation and terminating in contacts of the automatic cut-out; and conductors connecting the controller-circuit terminals with the master-switch; said master-switch being adapted to connect the terminal wires of the controller-magnet circuit with a source of electric energy and to reduce progressively the resistance in these circuits.

50. In a motor-controlling system, the combination of a master-switch; a controller consisting of the main switch, the brake-magnet, a switch actuated by the brake-magnet to actuate the main switch, resistance cut-outs, switches to accelerate the motor velocity, the current-controller for making the resistance cut-outs inoperative, the automatic cut-out operated to cut out all the switches, conductors connecting the magnets of the controller in proper relation and terminating in contacts of the automatic cut-out; and conductors connecting the controller-circuit terminals with the master-switch; said master-switch being adapted to connect the terminal-wires of the controller-magnet circuit with a source of electric energy and to reduce progressively the resistance in these circuits.

51. In a motor-controlling system, the combination of a master-switch; a controller consisting of a main switch, the brake-magnet arranged to close a circuit to the main switch, resistance cut-outs arranged to be controlled by the main switch, a resistance cut into the magnet-circuit of the main switch, the speed-accelerating switches controlled by the resistance cut-out switches, and the resistance in the circuit of these switches; conductors connecting the magnets of the controller in proper relation, terminating in one wire for each direction of rotation of the motor; conductors connecting the controller-circuit terminals with the master-switch; said master-switch being adapted to connect the terminal wires of the controller-magnet circuit with a source of electric energy and to reduce progressively the resistance in these circuits.

52. In a motor-controlling system, the combination of a master-switch; controllers consisting of electromagnetic switches, provided with a cut-out actuated by the motor-current that breaks the circuit through the magnet-circuits of all the switches, and a retaining magnetizing-coil having its circuit closed by the cut-out and holding the cut-out in the cut-out position; conductors connecting the magnets of the controller in proper relation and terminating in contacts of the automatic cut-out, line-wires connecting the circuit-terminals of the several controllers in parallel with each other and with the master-switch; an indicator and a wire leading from the automatic cut-out through the retaining-coil to a line-wire, and thence through indicator to the master-switch circuit; said master-switch being connected with a source of electric energy and with the line-wires, and arranged to move over a number of contacts and thereby to reduce, progressively, the resistance in the controller-magnet circuit.

53. In a motor-controlling system, the combination of a master-switch; controllers consisting of electromagnetic switches, provided with a cut-out actuated by the motor-current, that breaks the circuit through the magnet-circuits of all the switches, and a retaining magnetizing-coil having its circuit closed by the cut-out and holding the cut-out in the cut-out position; conductors connecting the magnets of the controller in proper relation and terminating in one wire for each direction of rotation of the motors; line-wires connecting the circuit-terminals of the several controllers in parallel with each other and with the master-switch; resistances in one of the line-wires; an indicator and a wire connecting the cut-out with a line-wire having the resistances between resistances to close circuit through the indicator when motors are cut out; said master-switch being connected with a source of electric energy, and adapted to connect with the line-wires to advance step by step, and as it advances to reduce the resistance in the controller-magnet circuit.

54. In a motor-controlling system, the combination of a master-switch; controllers consisting of electromagnetic switches, and provided with a cut-out actuated by the motor-current, that breaks the circuit through the magnet-circuits of all the switches, and a retaining magnetizing-coil having its circuit closed by the cut-out and holding the cut-out in the cut-out position; conductors connecting the magnets of the controller in proper relation and terminating in one wire for each direction of rotation of the motors; line-wires connecting the circuit-terminals of the several controllers in parallel with each other and with the master-switch; an indicator; a wire running from the cut-out to one of the line-wires to close circuit through the indicators when motors are cut out; and a resistance in this wire; said master-switch being connected with a source of electric energy, and with the line-wires, through resistances, and adapted to cut out these resistances as it advances step by step.

55. In a motor-controlling system, the combination of a master-switch; controllers consisting of electromagnetic switches, and provided with a cut-out actuated by the motor-current, that breaks the circuit through the magnet-circuits of all the switches, and a retaining magnetizing-coil having its circuit closed by the cut-out holding the cut-out in the cut-out position; conductors connecting the magnets of the controller in proper relation and terminating in one wire for each direction of rotation of the motors, line-wires connecting the circuit-terminals of the several controllers in parallel with each other and with the master-switch; resistances in one of the line-wires; an indicator in circuit with this wire; a wire leading from contacts on the cut-out through the retaining-coil to one of the line-wires between the resistances in the said line-wire, and the indicator being connected outside of these resistances; said master-switch being connected with a source of electric energy, and with the line-wires through two resistances, and arranged to move over contacts and to cut out these resistances as it moves.

56. In a motor-controlling system, the combination of a master-switch; controllers consisting of a main switch; resistance-cut-out switches, a current-controller, mechanism actuated by the controller, and an automatic cut-out to break the controller-magnet circuit and thus cut out the motors; conductors connecting the magnets of the controller in proper relation and terminating in contacts of the automatic cut-out that are normally connected with two line-wires; line-wires connecting the circuit-terminals of the several controllers in parallel with each other and with the master-switch; resistances in one of the line-wires; an indicator and a wire connecting the automatic cut-out with said line-wire between resistances to close circuit through the indicator when motors are cut out; said master-switch being connected with a source of electric energy and with the line-wires, and arranged to move over a number of contacts and thereby to reduce, progressively the resistance in the controller-magnet circuit.

57. In a motor-controlling system, the combination of a master-switch; controllers consisting of a main switch, resistance-cut-out switches, a current-controller, mechanism actuated by the controller, and an automatic cut-out to break the controller-magnet circuit and thus cut out the motors; conductors connecting the magnets of the controller in proper relation and terminating in contacts of the automatic cut-out that are normally connected with line-wires, line-wires connecting the circuit-terminals of the several controllers in parallel with each other and with the master-switch; an indicator; resistances in one of the line-wires; a conductor running from the automatic cut-out to one of the line-wires to close circuit through the indicator when motors are cut out; and a resistance in this last circuit; said master-switch being connected with a source of electric energy adapted to connect with the line-wires, to advance step by step, and as it advances to reduce the resistance in the controller-magnet circuits.

58. In a motor-controlling system, the combination of a master-switch; controllers consisting of a main switch, resistance-cut-out switches, a current-controller, mechanism actuated by the controller, and an automatic cut-out to break the controller-magnet circuit and thus cut out all the motors; conductors connecting the magnet of the controller in proper relation and terminating in one wire for each direction of rotation of the motors; line-wires connecting the circuit-terminals of the several controllers in parallel with each other and with the master-switch; resistances in one of the line-wires; an indicator; and a wire leading from contacts on the automatic cut-out through the retaining-coil thereof to one of the line-wires between the resistances, the indicator being connected outside of these resistances; said master-switch being connected with a source of electric energy and adapted to connect with either one of two line-wires and to reduce the resistance in the controller-magnet circuits as it advances from first to last position.

59. In a motor-controlling system, the combination of a master-switch; a controller consisting of a main switch, resistance-cut-out switches, a current-controller, mechanism actuated by the controller, and an automatic cut-out to break the controller-magnet circuit and thus cut out the motors; conductors connecting the magnets of the controller in proper relation and terminating in one wire for each direction of rotation of the motors; circuits connecting the controller-circuit terminals with the master-switch; an indicator; and a wire leading from the automatic cut-out through the retaining-coil thereof to a line-wire, and thence through the indicator to the master-switch circuit; said master-switch being adapted to connect the terminal wires of the controller-magnet circuit with a source of electric energy and to reduce progressively the resistance in these circuits.

60. In a motor-controlling system, the combination of a master-switch; controllers consisting of the break-magnet, a switch actuated by said magnet, the main switch, resistance cut-outs, a current-controller for holding the resistance cut-outs against movement; and an automatic cut-out to break the controller-magnet circuit; conductors connecting the magnet of the controller in proper relation and terminating at the line-wires; line-wires connecting the circuit-terminals of the several controllers in parallel with each other and with the master-switch; an indicator; a wire leading from the automatic cut-out through the retaining-coil thereof to one of the line-wires, and thence through the indicator to the master-switch circuit; said master-switch being connected with a source of electric energy and with the line-wires, and arranged to move over a number of contacts and thereby to reduce progressively, the resistance in the controller-magnet circuit.

61. In a motor-controlling system, the combination of a master-switch; controllers consisting of the brake-magnet, a switch actuated by the brake-magnet, the main switch, resistance cut-outs, current-controller for holding the resistance cut-outs against movement, and an automatic cut-out to break the controller-magnet circuit; conductors connecting the magnets of the controller in proper relation and terminating in contacts of the automatic cut-out that are normally connected with two line-wires; line-wires connecting the circuit-terminals of the several controllers in parallel with each other and with the master-switch; the resistances in the line-wires; an indicator; and a wire leading from contacts on automatic cut-out through the retaining-coil thereof to a line-wire between the resistances, the indicator being connected outside of these resistances; said master-switch being connected with a source of electric energy adapted to connect with the line-wires to advance step by step and as it advances to reduce the resistances in the controller-magnet circuits.

62. In a motor-controlling system, the combination of a master-switch; controllers consisting of the brake-magnet; a switch actuated by the brake-magnet, the main switch, resistance cut-outs, current-controller for holding the resistance cut-outs against movement; and an automatic cut-out to break the controller-magnet circuit; conductors connecting the magnets of the controller in proper relation and terminating in contacts of the automatic cut-out that are normally connected with two of the line-wires; line-wires connecting the circuit-terminals of the several controllers in parallel with each other and with the master-switch; an indicator; and a circuit running from the automatic cut-out through to one of the line-wires to close circuit through the indicator when motors are cut out; and a resistance in the last circuit; said master-switch being connected with a source of electric energy, and with the line-wires through two resistances, and arranged to move over contacts and to cut out these resistances as it moves.

63. In a motor-controlling system, the combination of a master-switch; controllers consisting of the main switch, resistance cut-outs, switches to change motor connections from series to parallel, the magnetic circuits of these being controlled by the last-operating resistance cut-out; current-controller for holding the resistance cut-outs against movement, and an automatic cut-out to break the controller-magnet circuit; conductors connecting the magnets of the controller in proper relation and terminating in contacts of the automatic cut-out that are normally connected with two of the line-wires, line-wires connecting the circuit-terminals of the several controllers in parallel with each other and with the master-switch; resistances in one of the line-wires; an indicator; and a wire connecting the automatic cut-out with a line-wire between resistance in the line-wire to close circuit through the indicator when motors are cut out; said master-switch being connected with a source of electric energy and with the line-wires, and arranged to move over a number of contacts and thereby to reduce, progressively, the resistance in the controller-magnet circuit.

64. In a motor-controlling system, the combination of a master-switch; controllers consisting of electromagnetic switches, and provided with a cut-out having a retaining magnetizing-coil and actuated by the motor-current, that breaks the circuit through the magnet-circuits of all the switches and closes the circuit through the retaining magnetizing-coil, that holds the cut-out in the cut-out position; conductors connecting the magnets of the controller in proper relation and terminating in contacts of the automatic cut-out that are normally connected with two of the line-wires; line-wires connecting the circuit-terminals of the several controllers in parallel with each other and with the master-switch; an indicator; and a wire leading from the automatic cut-out through the retaining-coil to one of the line-wires and thence through the indicator to the master-switch circuit; said master-switch being connected with a source of electric energy and with the line-wires, and arranged to move over a number of contacts and thereby to reduce, progressively, the resistance in the controller-magnet circuit.

65. In a motor-controlling system, the combination of a master-switch; controllers consisting of a main switch, resistance cut-out switches; a current-controller, mechanism actuated by the controller, and an automatic cut-out to break the controller-magnet circuit and thus cut out the motors; conductors connecting the magnets of the controller in proper relation and terminating in contacts of the automatic cut-out that are normally connected with two of the line-wires; line-wires connecting the circuit-terminals of the several controllers in parallel with each other and with the master-switch; an indicator provided with a dial and a pointer, the latter being moved by the current that passes through the instrument, the extent of its movement being proportional to the strength of the current; resistances in one of the line-wires; and a wire connecting the automatic cut-out with a line-wire between resistances to close circuit through the indicator when motors are cut out; said master-switch being connected with a source of electric energy and adapted to connect with either one or two line-wires to advance step by step and as it advances to reduce the resistance in the controller-magnet circuits.

66. In a motor-controlling system, the combination of a master-switch; controllers consisting of the brake-magnet, a switch actuated by the brake-magnet, the main switch, resistance cut-outs, current-controller for holding the cut-outs against movement; and an automatic cut-out to break the controller-magnet circuit; conductors connecting the magnets of the controller in proper relation and terminating in contacts of the automatic cut-out that are normally connected with two of the line-wires; line-wires connecting the circuit-terminals of the several controllers in parallel with each other and with the master-switch; an indicator, the movement of which is controlled by the strength of the current that actuates it provided with means to indicate the extent of its movement; resistances in one of the line-wires, and a wire leading from contacts on automatic cut-out through the retaining-coil, thence to one of the line-wires between the resistances, the indicator being connected outside of these resistances; said master-switch being connected with a source of electric energy and adapted to connect with the line-wires to advance step by step and as it advances to reduce the resistance in the controller-magnet circuits.

67. In a motor-controlling system, the combination of a master-switch; controllers consisting of the main switch, resistance cut-outs; switches to change motor connections from series to parallel, the magnet-circuit of these being controlled by the last operating resistance cut-out; current-controller for holding the resistance cut-outs against movement; and an automatic cut-out to break the controller-magnet circuit; conductors connecting the magnet of the controller in proper relation and terminating in contacts of the automatic cut-out that are normally connected with two of the line-wires; line-wires connecting the circuit-terminals of the several controllers in parallel with each other and with the master-switch; an indicator actuated by current transmitted through the master-switch provided with a switch for opening its circuit; a conductor running from the automatic cut-out to one of the line-wires to close circuit through the indicator when motors are cut out, and a resistance in this last conductor; said master-switch being connected with a source of electric energy and with the line-wires, through resistances, and adapted to cut out these resistances as it advances step by step.

68. In a motor-controlling system, the combination of a master-switch; controllers consisting of the brake-magnet; a switch operated by the brake-magnet, the main switch, resistance cut-outs; switches to accelerate the motor velocity, the current-controller for holding the cut-outs against movement; and the automatic cut-out to break the controller-magnet circuit; conductors connecting the magnets of the controller in proper relation and terminating in contacts of the automatic cut-out that are normally connected with two of the line-wires, line-wires connecting the circuit-terminals of the several controllers in parallel with each other and with the master-switch; an indicator, the movement of which is controlled by the current passing through it; resistances in one of the line-wires; and a wire connecting the automatic cut-out with a line-wire between the resistances in the line-wire to close circuit through the indicator; said master-switch being connected with a source of electric energy and adapted to connect with the line-wires, to advance step by step and as it advances, to reduce the resistance in the controller-magnet circuits.

69. In a motor-controlling system, the combination of a master-switch; controllers consisting of electromagnetic switches, and provided with a cut-out having a magnetizing-coil actuated by the motor-current that breaks the circuit through the magnet-circuits of all the switches and closes the circuit through a retaining magnetizing-coil that holds the cut-out in the cut-out position; an indicator, the movement of which is controlled by the current passing through it; a wire leading from the automatic cut-out through the retaining-coil to a line-wire, and thence through the indicator to the master-switch circuit; and line-wires connecting the circuit-terminals of the several controllers in parallel with each other and with the master - switch; said master-switch being connected with a source of electric energy and with the line-wires; and arranged to move over a number of contacts and thereby to reduce, progressively, the resistance in the controller-magnet circuit.

70. In a motor-controlling system, the combination of a master-switch; controllers consisting of a main switch; resistance - cut - out switches, a current-controller, mechanism actuated by the controller for holding the cut-outs against movement and an automatic cut-out to break the controller-magnet circuit and thus cut out the motors; an indicator provided with a dial and a pointer, the latter being moved by the current that passes through the instrument, the extent of its movement being proportional to the strength of the current; resistances in one of the line-wires; a wire connecting the automatic cut-out with a line-wire between the resistances to close circuit through the indicator when motors are cut out; and line-wires connecting the circuit-terminals of the several controllers in parallel with each other and with the master-switch; said master-switch being connected with a source of electric energy and adapted to connect with either one of two line-wires, and to reduce the resistance in the controller-magnet circuits as it advances from first to last position.

71. In a motor-controlling system, the combination of a master-switch; controllers consisting of the brake-magnet; a switch actuated by said magnet; the main switch; resistance cut-outs; current-controller for holding the cut-outs against movement, and an automatic cut-out to break the controller-magnet circuit; line-wires connecting the circuit-terminals of the several controllers in parallel with each other and with the master-switch; an indicator, the movement of which is controlled by the strength of the current that actuates it, provided with means to indicate the extent of its movement; a conductor running from the automatic cut-out to one of the line-wires to close circuit through the indicator when motors are cut out; and a resistance in the last-named conductor; said master-switch being connected with a source of electric energy and adapted to connect with the line-wires to advance step by step and as it advances to reduce the resistance in the controller-magnet circuits.

72. In a motor-controlling system, the combination of a master-switch; controllers consisting of the main switch; resistance cut-outs; switches to change motor connections from series to parallel, the magnet-circuits of these being controlled by the last operating resistance cut-out; a current-controller for holding the cut-outs against movement, and an automatic cut-out to break the controller-magnet circuit; line-wires connecting the circuit-terminals of the several controllers in parallel with each other and with the master-switch; an indicator actuated by current transmitted through the master-switch provided with a switch for opening its circuits; resistances in one of the line-wires; and a wire leading from contacts on the automatic cut-out through the retaining-coil thereof, to a line-wire between the resistances, the indicator being connected outside of these resistances; said master-switch being connected with a source of electric energy, and with the line-wires, through resistances, and adapted to cut out these resistances as it advances step by step.

73. In a motor-controlling system, the combination of a master-switch; controllers consisting of the brake-magnet, a switch actuated by the brake-magnet, the main switch, resistance cut-outs C to I, switches to accelerate the motor velocity, the current-controller holding the automatic cut-out against move- ment, and the automatic cut-out to break the controller-magnet circuit, line-wires connecting the circuit-terminals of the several controllers in parallel with each other and with a master-switch; resistances in one of the line-wires; the indicator provided with the switch 64, connected in its circuit; and a wire connecting the automatic cut-out with one of the line-wires between the resistances to close circuit through the indicator when motors are cut out; said master-switch being connected with a source of electric energy, and with the line-wires through two resistances and arranged to move over contacts and to cut out these resistances as it moves.

74. In a motor-controlling system, the combination of a master-switch; a controller consisting of electromagnetic switches, an automatic cut-out having a retaining-coil and arranged to stop the motors by opening the controller-magnet circuit; an indicator, the movement of which is controlled by the current passing through it; and conductors for connecting the cut-out retaining-coil, the indicator and the master-switch and arranged to energize the indictor when the cut-out acts.

75. In a motor-controlling system, the combination of a master-switch; a controller consisting of electromagnetic switches; an indicator the movement of which is controlled by the current passing through it, an automatic cut-out having a retaining magnetizing-coil actuated by the motor-current and arranged to open the controller-magnet circuit and to keep it open by the force of the retaining magnetizing-coil connected in the indicator-circuit, and conductors for connecting the cut-out retaining-coil, the indicator and the master-switch and arranged to energize the indicator when the cut-out acts.

76. In a motor-controlling system, the combination of a master-switch; controllers consisting of electromagnetic switches, each controller provided with an automatic cut-out having retaining-coil and arranged to stop the motors by opening the controller-magnet circuit; an indicator the movement of which is controlled by the current passing through it and conductors for connecting the cut-out retaining-coils in parallel with each other and in series with the indicator and the master-switch and arranged to pass a current through the indicator when the cut-outs act.

77. In a motor-controlling system, the combination of a master-switch; controllers consisting of electromagnetic switches, each controller being provided with an automatic cut-out having retaining-coils and actuated by the motor-current and arranged to open the controller-magnet circuit, an indicator the movement of which is controlled by the current passing through it, and conductors for connecting the cut-out retaining-coils in parallel with each other and in series with the indicator and the master-switch and arranged to pass a current through the indicator when the cut-outs act.

78. In a motor-controlling system, the combination of a master-switch; controllers consisting of electromagnetic switches, each controller provided with a cut-out connected in the motor-circuit and arranged to break the controller-magnet circuit and provided with a magnetizing-coil to hold the cut-out in active position, an indicator provided with a dial and a pointer, the latter being moved by the current that passes through the instrument the extent of its movement being proportional to the strength of the current, conductors for connecting the cut-out retaining-coils in parallel with each other and in series with the indicator and master-switch, and resistances included in these circuits to differentiate the strength of the current passing to the indicator when different cut-outs act.

79. In a motor-controlling system, the combination of a master-switch; controllers consisting of electromagnetic switches, each controller provided with an automatic cut-out provided with a retaining-coil and contacts and connectors, an indicator the movement of which is controlled by the strength of the current that actuates it provided with means to indicate the extent of its movement; and a line-wire for connecting the cut-out retaining-coils in parallel with each other, containing two resistances between each pair of retaining-coil connections, one terminal of the indicator being connected with this wire between these resistances, two other line-wires for connecting the master-switch with the controller-magnet circuits and to complete the indicator-circuit whereby current will pass through the indicator when a cut-out acts.

80. In a motor-controlling system, the combination of a master-switch; controllers consisting of electromagnetic switches, each controller provided with an automatic cut-out provided with contacts and connectors and a retaining-coil, an indicator the movement of which is controlled by the strength of the current that actuates it provided with means to indicate the extent of its movement, a line-wire for connecting the retaining-coils in parallel; two resistances in the line-wire between each pair of retaining-coil connections one terminal of indicator being connected between these resistances; and the main-line wires to which the other of the indicators are connected and which connect the controller-magnet circuits with master-switch whereby current will pass through the indicator when a cut-out acts.

81. In a motor-controlling system, the combination of a master-switch; controllers consisting of electromagnetic switches, each controller provided with an automatic cut-out provided with a retaining-coil and arranged to stop the motors by opening the controller-magnet circuit, an indicator the movement of which is controlled by the current passing through it, conductors for connecting the cut-out retaining-coils in parallel with each other and in series with the indicator and the master-switch and arranged to pass a current through the indicator when the cut-outs act, and a switch connected in the indicator-circuit by which the current may be interrupted and the cut-out turned to its normal position.

82. In a motor-controlling system, the combination of a master-switch; controllers consisting of electromagnetic switches, each controller being provided with an automatic cut-out provided with a retaining-coil, actuated by the motor-current and arranged to open the controller-magnet circuit; an indicator provided with a dial and a pointer, the latter being moved by the current that passes through the instrument the extent of its movement being proportional to the strength of the current; conductors for connecting the cut-out retaining-coils in parallel with each other and in series with the indicator and master-switch; resistances included in these circuits to differentiate the strength of the current passing to the indicator when different cut-outs act; and a switch connected in the indicator-circuit by which the current may be interrupted and the cut-out returned to its normal position.

83. In a motor-controlling system, the combination of a master-switch; controllers consisting of electromagnetic switches, each controller provided with a cut-out connected in the motor-circuit arranged to break the controller-magnet circuit and provided with a magnetizing-coil; an indicator the movement of which is controlled by the strength of the current that actuates it provided with means to indicate the extent of its movement; a line-wire for connecting the cut-out retaining-coils in parallel with each other; two resistances in the line-wire between each pair of retaining-coil connections, one terminal of the indicator being connected with this wire between these resistances; two other line-wires for connecting the master-switch with the controller-magnet circuits and to complete the indicator-circuit whereby current will pass through the indicator when a cut-out acts; and a switch connected in the indicator-circuit by which the current may be interrupted and the cut-out returned to its normal position.

84. In a motor-controlling system, the combination of a master-switch; controllers consisting of electromagnetic switches, each controller provided with an automatic cut-out operated in the manner described and provided with contacts and connectors and a retaining-coil; an indicator the movement of which is controlled by the strength of the current that actuates it provided with means to indicate the extent of its movement; a line-wire for connecting the retaining-coils in parallel; two resistances in the line-wire between each pair of retaining-coil connections, one terminal of indicator being connected between these resistances; the main-line wires to which the other terminals of the indicator are connected and connect the controller-magnet circuits with master-switch whereby current will pass through the indicator when a cut-out acts; and switch connected in the indicator-circuit by which the current may be interrupted and the cut-out returned to its normal position.

The foregoing specification signed this 28th day of August, 1903.

WILLIAM BAXTER, Jr.

In presence of—
STEPHEN H. OLIN,
JOHN H. PHAIR.